May 23, 1933.   A. O. AUSTIN   1,910,226
BUSHING INSULATOR
Filed June 30, 1928   2 Sheets-Sheet 1

INVENTOR
Arthur O. Austin.
BY
ATTORNEY

May 23, 1933.  A. O. AUSTIN  1,910,226
BUSHING INSULATOR
Filed June 30, 1928  2 Sheets-Sheet 2

INVENTOR
Arthur O Austin,
BY
ATTORNEY

Patented May 23, 1933

1,910,226

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

BUSHING INSULATOR

Application filed June 30, 1928. Serial No. 289,392.

This invention relates to bushing insulators which are especially useful in the insulation of conductors where they pass through the walls of housings for electrical apparatus containing liquid under pressure.

One object of the invention is to provide a bushing insulator which will maintain a liquid tight joint with the wall of a housing for electrical apparatus. A further object of the invention is to provide means by which the dielectric member may be changed without releasing the pressure within the housing. A further object is to provide a bushing insulator which shall be of improved construction and operation. Other objects and advantages will appear from the following description.

The invention is exemplified in the combination and arrangement of parts shown in the accompanying drawings and described in the following specification, and it is more particularly pointed out in the appended claims.

Figure 1:
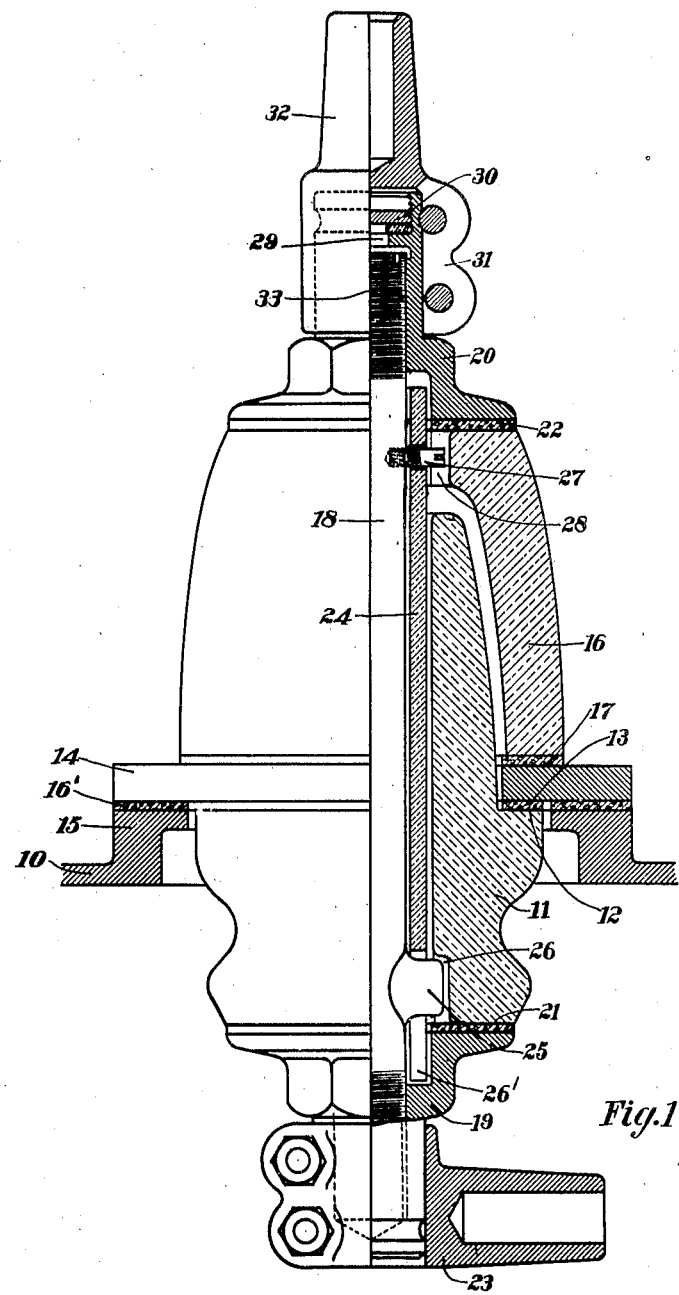
Fig. 1 is a part elevation and part section showing one embodiment of the present invention.

In many forms of electrical apparatus where a conductor extends through a wall, it is desirable to provide a tight closure for the opening in the wall, as well as to insulate the conductor from the wall. Where the closure depends upon a cemented joint, there is always danger of leakage through the joint, especially where there is pressure at one side of the wall. In many forms of housings for electrical apparatus, the interior of the housing is filled with liquid under pressure and it is sometimes desirable to renew a bushing without draining the housing or removing the liquid pressure.

The present invention provides a bushing in which the joint between the dielectric member and the wall of the housing is formed by a gasket gripped between parts which are mechanically pressed together so that it is possible to avoid all danger of leakage.

The opening in the wall of the housing is closed by two members which are separately pressed against opposite sides of the periphery of the wall so that one member may be removed while the other retains a tight union with the wall of the housing and provides a closure for the opening. This permits renewal of the dielectric member without releasing the pressure within the housing.

In the embodiment of the invention illustrated in the drawings, the numeral 10 designates the wall of a housing for electrical apparatus or other partition through which a conductor extends. A dielectric bushing 11 of porcelain or other suitable material, extends through an opening in the wall of the housing and is provided with a shoulder 12 which bears upon a gasket 13 surrounding the opening in the housing wall.

In the form of the invention illustrated, a metal plate 14 rests upon a boss 15 formed on the wall 10, but it will be understood that the dielectric member 11 can be made to engage the housing wall directly where desired. The plate 14 is tightly bolted to the boss 15 and is provided with a gasket 16' for forming a liquid-tight joint between the plate 14 and boss 15. Where this arrangement is used, the bushing can be clamped to the plate 14 in some cases, while the plate is still removed from the housing and the entire assembled bushing and plate secured to the housing after the bushing has been clamped to the plate.

A second dielectric member 16 fits over the projecting end of the sleeve 11, and bears upon a gasket 17 at the side of the plate 14 opposite the gasket 13. A conductor rod 18 extends through both dielectric members 11 and 16 and is provided with screw caps 19 and 20 at its opposite ends which bear upon the ends of the respective dielectric members to clamp the dielectric members against the gaskets 13 and 17. Gaskets 21 and 22 are interposed between the screw caps and their dielectric members respectively, to form tight joints. The lower cap 19 is closed at its end so that the lower end of the conductor rod 18 is threaded into a blind opening in the cap 19. In this way it will be seen that the cap 19 closes the end of the bushing 11 and since the bushing 11 closes the opening in the plate 14, the opening through the wall of the housing is completely closed by the bushing 11 and cap 19.

A terminal member 23 is attached to the cap 19 and forms electrical connection through the cap with the conductor rod 18.

A fiber tube or other suitable dielectric sleeve 24 may surround the conductor rod 18 within the bushings 11 and 16. The rod 18 is preferably provided with a lug 25 which extends into a notch 26 in the sleeve 11 to hold the rod 18 from rotation within the sleeve. A slot 26' is provided in the tube 24 to accommodate the lug 25. A removable pin 27 may be provided for engagement with a notch 28 in the dielectric member 16. The lugs 25 and 27 hold the rod 18 from rotation within their respective bushings to facilitate the caps 19 and 20 in place on the conductor rod. The cap 20 might be closed at its end similar to the cap 19, but in the embodiment shown in the drawing, an opening 29 is provided through the upper end of the cap 20, for a purpose hereinafter explained.

The opening 29 is closed by a disc or plug 30 threaded into the end of the cap and bearing upon a gasket 31 so that when the opening 29 is closed, the cap 20 forms a tight closure for the end of the dielectric member 16 and the dielectric member 16 and cap 20 together, form a tight closure for the opening in the plate 14. In this way a double closure is provided for the opening through the plate 14. A conductor terminal 32 is attached to the cap 20 and is electrically connected through the cap with the conductor rod 18.

Figure 2:
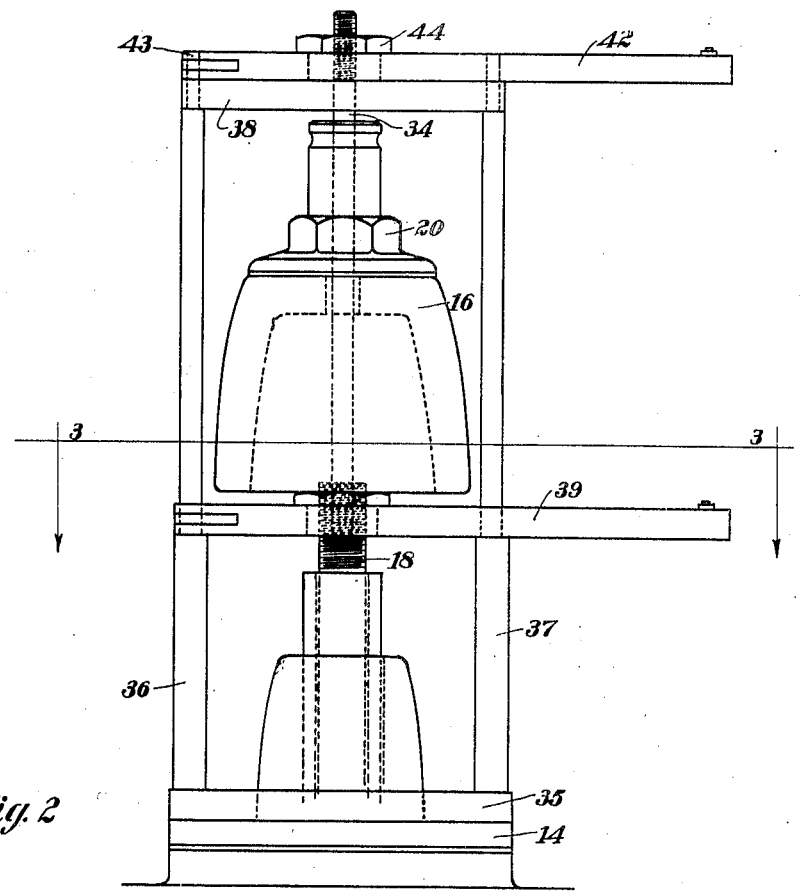
Fig. 2 is an elevation of one form of jack or tool which may be used for maintaining a tight connection while a dielectric member of the bushing insulator is being changed.

The upper end of the rod 18 is provided with a tapped opening 33 for receiving a threaded extension rod 34, as shown in Fig. 2. In case of injury to the dielectric member 16, the terminal 32 may be removed from the cap 20 and the disc 30 unscrewed from the interior of the cap to permit the extension rod to be threaded into the tapped opening 33.

Figure 3:
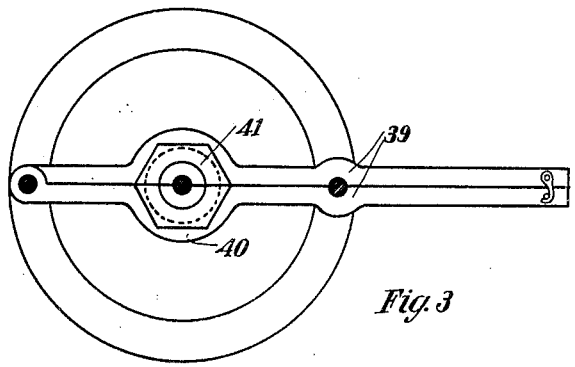
Fig. 3 is a horizontal section on line 3—3 of Fig. 2.

By providing a suitable jack connected with the extension rod 34, sufficient tension can be exerted on the conductor 18 to hold the bushing 11 tightly in place, independently of the outer dielectric member 16. This will permit maintenance of the tight joint between the bushing 11 and the housing, even though the outer dielectric member 16 may be injured or broken, and will also permit renewal of the outer bushing without releasing the pressure within the housing. One form of jack which may be used for this purpose is shown in Figs. 2 and 3 and comprises a base ring 35 arranged to bear upon the plate 14 outside of the procelain member 16.

Uprights 36 and 37 are carried by the ring 35 and an upper ring 38 may be supported at the upper ends of the uprights 36 and 37 to brace the upper ends of the uprights.

A pair of clamping arms 39 are pivoted upon the upright 36 at a level with the threaded end of the conductor 18. The arms 39 are provided with an enlargement 40 for receiving a split nut 41, the interior of which is threaded to fit the threads on the upper end of the conductor 18. A second pair of arms 42 is pivoted at 43 on the upper end of the upright 36 and the arms 42 are arranged to receive a split nut 44 secured to the nut 41 but provided with threads for engaging the threaded upper end of the extension 34.

When it is desired to remove one of the insulator parts 16, the conductor 32 is removed and the extension 34 is secured to the end of the conductor 16. The jack is then placed in position with the base ring 35 bearing upon the plate 14, as shown in Fig. 2, the arms 39 being opened so that they will not strike the cap 20.

The split nut 44 is placed upon the extension 34 and the arms 42 clamped about the nut. The nut may then be tightened to place tension on the extension 34 and the conductor 18. The cap 20 may then be unscrewed from the conductor 18 without releasing the pressure on the gasket 13 since this pressure is maintained by the extension 34 and rod 18. The cap 20 may then be raised to the position shown in Fig. 2 and the dielectric member 16 may also be lifted, as shown in that figure, or may be broken off, if desired. The nut 41 may then be placed upon the threaded end of the conductor 18 and the arms 39 clamped upon the nut. The nut may then be tightened to take the tension of the conductor 18 after which the arms 42 can be opened and the cap 20 removed from the end of the extension 34. By reversing this process a new dielectric member 16 can be placed upon the conductor 18 and the cap 20 returned to its position upon the end of the conductor without releasing the tension upon the conductor. Since the bushing 11 is arranged inside of the bushing 16, it is protected from injury and will seldom, if ever, require renewal.

It will be seen that the arrangement provides a bushing having a double gasket joint with the wall of the housing, the parts being held in place by mechanical pressure and that no cemented joint is required. The inner dielectric member is protected from injury by the outer member and provision is made for renewal of the outer member without the necessity of opening the joint between the inner member and the wall of the housing.

I claim:—

1. The combination with a wall having an opening therethrough, of a conductor extending through said opening, a pair of dielectric members surrounding said conductor and engaging said wall at opposite sides thereof, a cap threaded on said conductor and engaging one of said dielectric members, said cap having an opening through the end thereof to permit insertion of an extension through said cap, the end of said conductor being threaded to receive said extension.

2. The combination with a wall having an opening therethrough, of a conductor extending through said opening, a pair of dielectric members surrounding said conductor and engaging said wall at opposite sides thereof, a holding member threaded on said conductor and engaging one of said dielectric members, said holding member being open at the end thereof adjacent the outer end of said conductor to permit attachment of an extension to said conductor, the outer end of said conductor being threaded to receive said extension.

3. The combination with a wall having an opening therethrough, of a conductor extending through said opening, a pair of dielectric members surrounding said conductor and engaging said wall at opposite sides thereof, a holding member threaded on said conductor and engaging one of said dielectric members, and means of a size to pass through the threaded opening in said holding member for attaching an extension to the end of said conductor.

In testimony whereof I have signed my name to this specification this 23rd day of June, A. D. 1928.

ARTHUR O. AUSTIN.